US012627203B2

(12) United States Patent
Kim et al.

(10) Patent No.: US 12,627,203 B2
(45) Date of Patent: May 12, 2026

(54) VARNISH IMPREGNATION DEVICE OF STATOR COIL WINDING

(71) Applicants: Hanon Systems, Daejeon (KR); B.M.C CO., LTD., Anseong-si (KR)

(72) Inventors: Min Hwan Kim, Daejeon (KR); Sung Moon Kang, Buk-gu (KR); Young Ki Kim, Buk-gu (KR); Chan Ho Baek, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 190 days.

(21) Appl. No.: 18/423,957

(22) Filed: Jan. 26, 2024

(65) Prior Publication Data

US 2024/0364191 A1     Oct. 31, 2024

(30) Foreign Application Priority Data

Apr. 28, 2023     (KR) ........................ 10-2023-0056075

(51) Int. Cl.
H02K 15/026          (2025.01)
H02K 3/32            (2006.01)
(52) U.S. Cl.
CPC ............. H02K 15/026 (2013.01); H02K 3/32 (2013.01); H02K 2215/00 (2021.08)
(58) Field of Classification Search
None
See application file for complete search history.

(56) References Cited

U.S. PATENT DOCUMENTS

| | | | |
|---|---|---|---|
| 5,939,102 | A | 8/1999 | George, Jr. |
| 2020/0366170 | A1 | 11/2020 | Agapiou |
| 2024/0364195 | A1* | 10/2024 | Kim ..................... H02K 15/026 |

FOREIGN PATENT DOCUMENTS

| | | | | |
|---|---|---|---|---|
| DE | 102017222322 | A1 | 6/2018 | |
| DE | 102019103133 | B3 | 7/2020 | |
| JP | 07039120 | A * | 7/1995 | |
| JP | 2016-197972 | A | 11/2016 | |
| JP | 2021-035278 | A | 3/2021 | |
| KR | 10-2014-0142422 | A | 12/2014 | |
| KR | 20140142422 | A * | 12/2014 | .............. H02K 3/47 |

* cited by examiner

*Primary Examiner* — Michael P. Rodriguez
(74) *Attorney, Agent, or Firm* — Shumaker, Loop & Kendrick, LLP; James D. Miller

(57)          ABSTRACT

A varnish impregnation device including: a lower housing in which a stator is seated in an internal space thereof, the stator including a stator core which has a plurality of teeth protruding inward or outward and has a slot that is a space between the teeth. A coil winding passes through the slot and is wound around the teeth. A second cover member is coupled to an upper outer portion of the stator core. The lower housing has a plurality of varnish supply holes which is formed to pass up and down through a lower surface thereof, and the plurality of varnish supply holes communicates with the slot.

9 Claims, 7 Drawing Sheets

VARNISH IMPREGNATION DEVICE OF STATOR COIL WINDING

CROSS-REFERENCE TO RELATED APPLICATIONS

The present application claims the benefit of and priority to South Korean Patent Application No. 10-2023-0056075, filed Apr. 28, 2023, the entire contents of which are incorporated herein for all purposes by reference.

FIELD

The present disclosure relates to a varnish impregnation device of a stator coil winding, and more particularly to a new structured varnish impregnation device which applies, by means of vacuum impregnation, varnish on a coil winding included in a stator of a motor such that the varnish is applied only on necessary portions of a material to be impregnated, thereby improving the quality and production efficiency of a product.

BACKGROUND

Generally, a stator of a motor includes a stator core, upper and lower insulators coupled to the top and bottom of the stator core, and a coil winding wound on teeth. The coil winding is wound on the teeth and is located in a slot that is a space between the teeth.

Such a motor is applied in various fields such as home appliances, automobiles, and robots, etc. In particular, in a motor that is used in humid environments, such as a compressor of a refrigerator or an air conditioner, a fluid such as moisture, etc., may come into contact with the coil winding. Therefore, unless the surface of the coil winding is not insulated, the coil winding may be short-circuited due to moisture, etc. This may cause the motor to fail or to be fired. Accordingly, in order to prevent product defects due to the low insulation resistance of the coil winding, it is necessary to obtain an insulation resistance above a certain level on the surface of the coil winding.

As a method for obtaining the insulation resistance, there is a method of forming a varnish film on the surface of the coil winding by impregnating the stator into varnish. As a prior art for the above method, Japanese Patent Application Laid-open No. S60-77650 discloses a method of applying varnish to a coil winding by impregnating a stator, which is a material to be impregnated, into a varnish impregnating liquid. Japanese Patent Application Laid-open No. Hei 06-36954 discloses a method of applying varnish to a coil winding by dropping the varnish from the top while transferring electrical parts such as a stator through a conveyor.

However, in these prior arts, the varnish is applied by impregnating the stator into the varnish impregnating liquid or by dropping the varnish from the top of the stator, so that the varnish liquid remains on the inner and outer surfaces of the stator, etc., other than the coil winding. Therefore, in order to improve the quality and performance of the motor, the varnish remaining on the inner and outer surfaces of the stator must be removed to obtain the inner and outer diameter dimensions of the stator core.

Furthermore, since a separate process must be performed to remove the varnish remaining on the inner and outer surfaces of the stator, a motor manufacturing process for increasing the insulation resistance in the coil winding is complicated, resulting in a decrease in productivity and an increase in the manufacturing cost of the motor assembly.

Also, it is difficult to completely remove the varnish remaining on the inner and outer surfaces of the stator, which may lead to a decrease in motor quality and an increase in defect rate.

Accordingly, in order to solve the above-mentioned problems, the present disclosure proposes a new structured varnish impregnation device that supplies the varnish to the coil winding and performs vacuum impregnation.

SUMMARY

The purpose of the present disclosure is to provide a new structured varnish impregnation device capable of increasing the insulation resistance of the coil winding by applying the varnish only on the coil winding portion other than the inner and outer surfaces of the stator.

The purpose of the present disclosure is to provide a new structured varnish impregnation device capable of improving productivity and of reducing the manufacturing cost.

All of the above-mentioned purposes and other inherent purposes can be easily achieved by the following embodiments of the present disclosure.

One embodiment is a varnish impregnation device including: a lower housing in which a stator is seated in an internal space thereof, the stator including a stator core which has a plurality of teeth protruding inward or outward and has a slot that is a space between the teeth; upper and lower insulators respectively coupled to upper and lower portions of the stator core; and a coil winding that passes through the slot and is wound around the teeth; a lower sealing portion which is coupled to a lower portion of an inner space of the stator seated in the internal space of the lower housing; a central sealing portion which is positioned over the lower sealing portion; an upper sealing portion which is positioned over the central sealing portion; a first cover member which is coupled to an upper portion of the upper sealing portion and an inner upper portion of the upper insulator; and a second cover member which is coupled to an upper outer portion of the stator core and an outer circumference of the upper insulator at a certain distance from a circumference of the first cover member. The lower housing has a plurality of varnish supply holes which is formed to pass up and down through a lower surface thereof, and the plurality of varnish supply holes communicates with the slot.

A first packing member is installed between an upper portion of the central sealing portion and a lower portion of the upper sealing portion and seals an upper portion of an inner space of the stator core, thereby preventing varnish from flowing into the upper portion of the inner space of the stator core.

A second packing member is installed between a lower portion of the central sealing portion and an upper portion of the lower sealing portion and seals a lower portion of an inner space of the stator core, thereby preventing the varnish from flowing into the lower portion of the inner space of the stator core.

A pair of fixed supports is formed to protrude upward from an outer wall of the lower housing. A fastening portion is coupled to the fixed support by a hinge and the fastening portion is rotatably coupled by the hinge. A bent portion formed to be bent at a top of the fastening portion fastens and compresses the first and second cover members.

The varnish impregnation device further includes a supporting member which is installed on a bottom surface of the internal space of the lower housing and is installed on a lower inner diameter portion of the lower insulator of the stator.

A third packing member is installed between the lower inner diameter portion of the lower insulator and the supporting member and prevents varnish from flowing into an inside of the lower insulator.

A fourth packing member is installed on an outermost peripheral portion of a bottom surface of the internal space of the lower housing and seals a lower outer diameter portion of the lower insulator, thereby preventing varnish from flowing into the lower outer diameter portion of the lower insulator.

A fifth packing member is installed on a circumference of a bottom surface of the first cover member and seals an upper inner diameter portion of the upper insulator, thereby preventing varnish from flowing from an upper portion of the stator into an inner surface of the stator.

A sixth packing member is installed on a bottom surface of the second cover member and seals an upper outer diameter portion of the upper insulator, thereby preventing the varnish from flowing from the upper portion of the stator into an outer surface of the stator.

According to the embodiment of the present disclosure, the stator is seated in the varnish impregnation device disposed within the vacuum chamber, and the coil winding is impregnated by supplying the varnish to the slot of the stator by a vacuum pressurization method. As a result, the insulation resistance is increased, so that the insulation efficiency of the coil winding is improved.

According to the embodiment of the present disclosure, the varnish supply hole the lower housing of the varnish impregnation device is made to correspond to the slot of the stator, and the varnish is supplied. Accordingly, the varnish is supplied rapidly and a time for which the varnish is applied to the coil winding is reduced, so that there is an effect of improving productivity.

According to the embodiment of the present disclosure, the varnish is not applied to the inner and outer surfaces of the stator other than the coil winding, so that there is no change in the inner and outer diameter dimensions of the stator, so that the defective rate of the stator is reduced and the product quality is improved.

According to the embodiment of the present disclosure, since the varnish is applied only to the coil winding excluding the inner and outer surfaces of the stator, a process of removing the varnish that may remain on the inner and outer surfaces of the stator core is omitted, thereby shortening the manufacturing process and improving the productivity. Therefore, there is an effect of reducing the manufacturing cost of the stator.

According to the embodiment of the present disclosure, the varnish is impregnated and applied only to the coil windings arranged in the slots of the stator, so that the varnish consumption is reduced and the manufacturing cost is reduced.

Hereinafter, preferred embodiments of the present invention will be described in detail with reference to the accompanying drawings.

DETAILED DESCRIPTION

Figure 1:
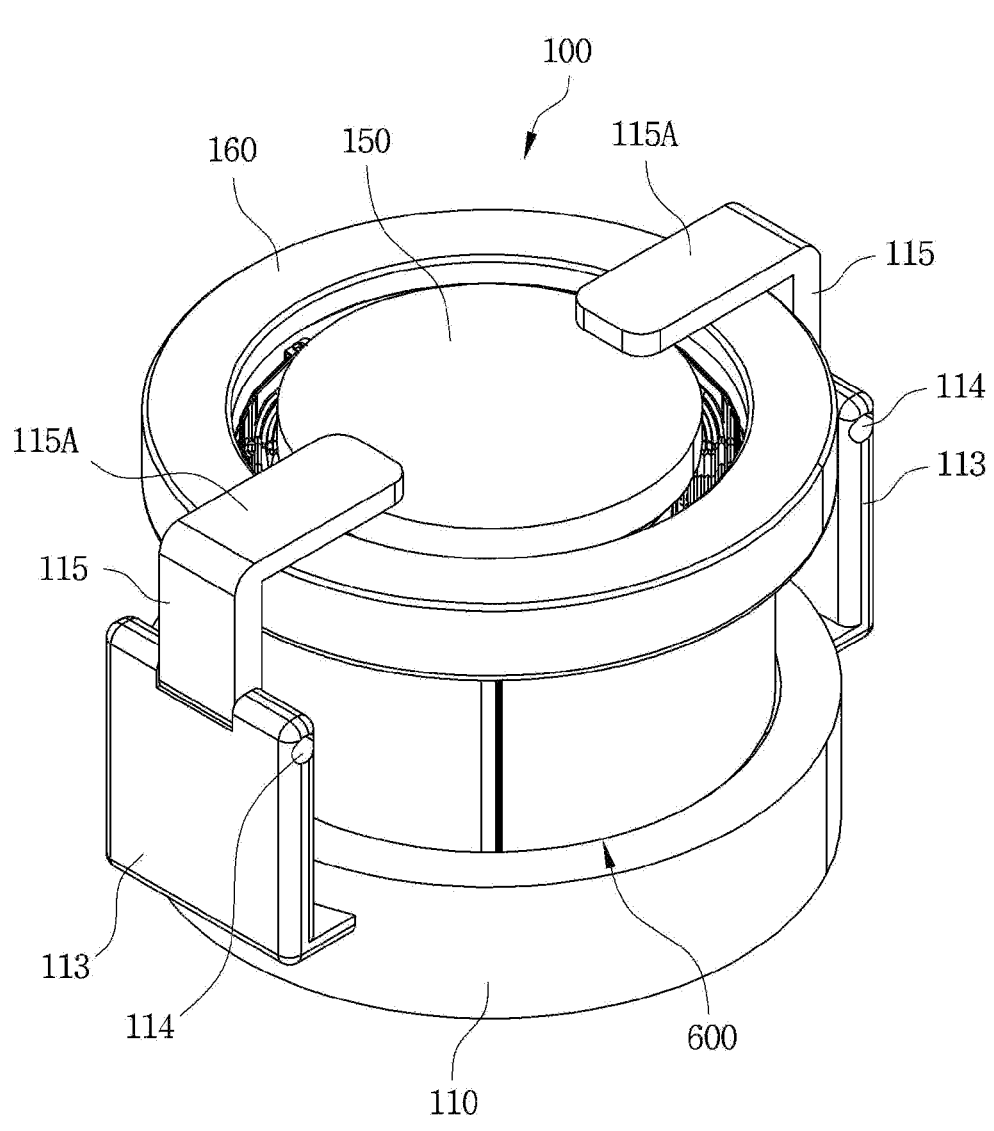
FIG. 1 is a perspective view showing a varnish impregnation device according to an embodiment of the present disclosure.
Figure 2:
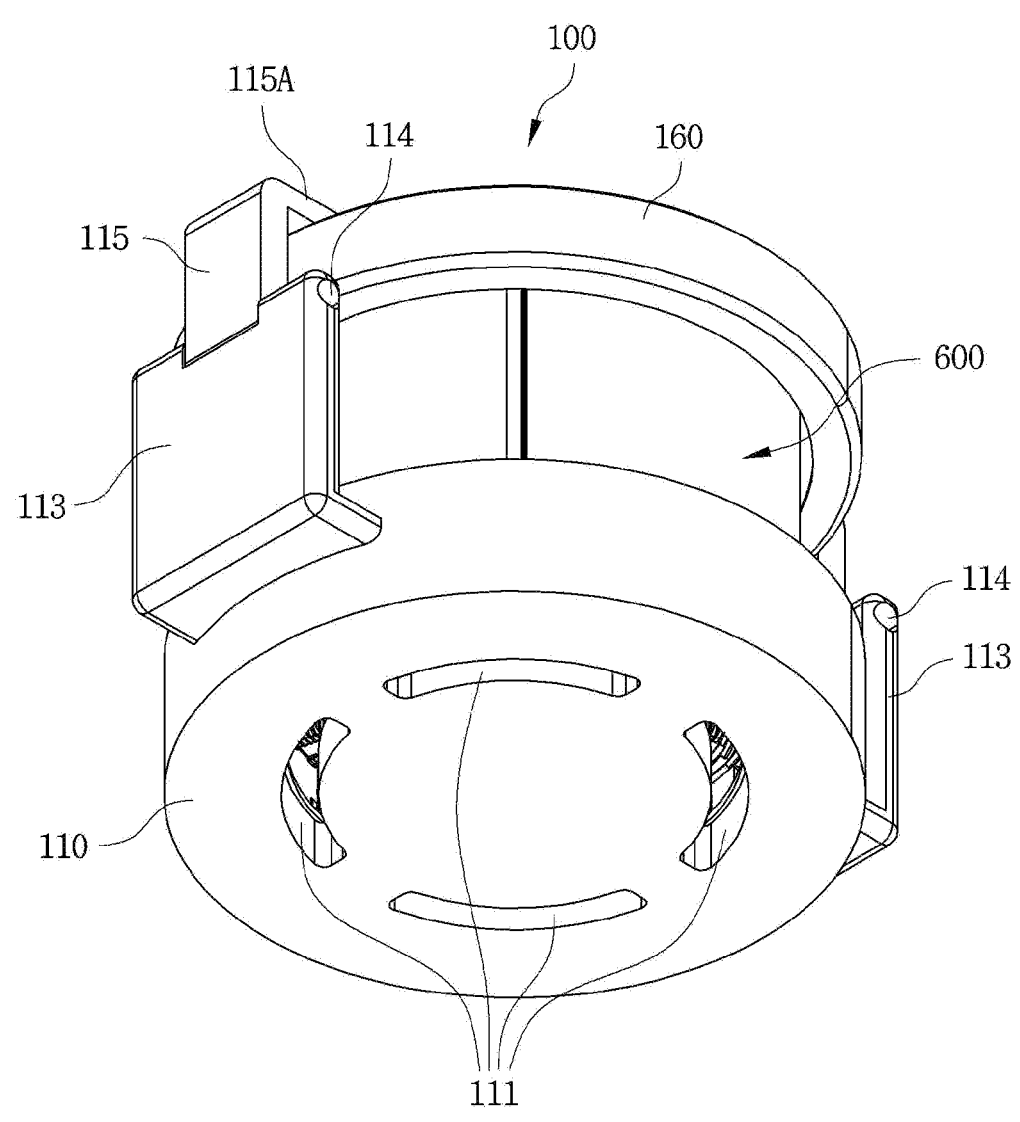
FIG. 2 is a perspective view showing the varnish impregnation device according to the embodiment of the present disclosure from below.
Figure 3:
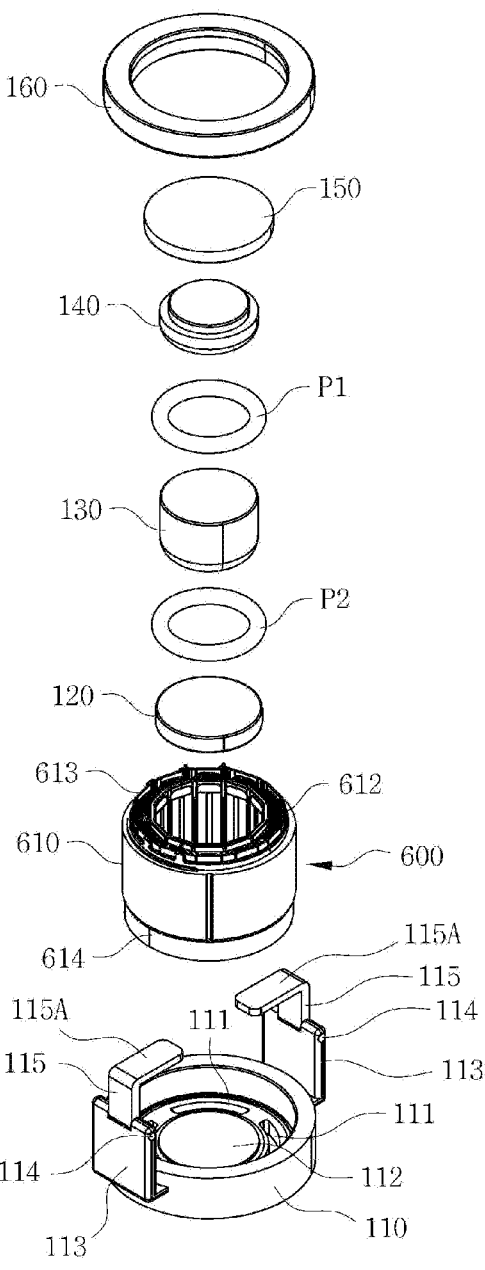
FIG. 3 is an exploded perspective view of the varnish impregnation device according to the embodiment of the present disclosure.
Figure 4:
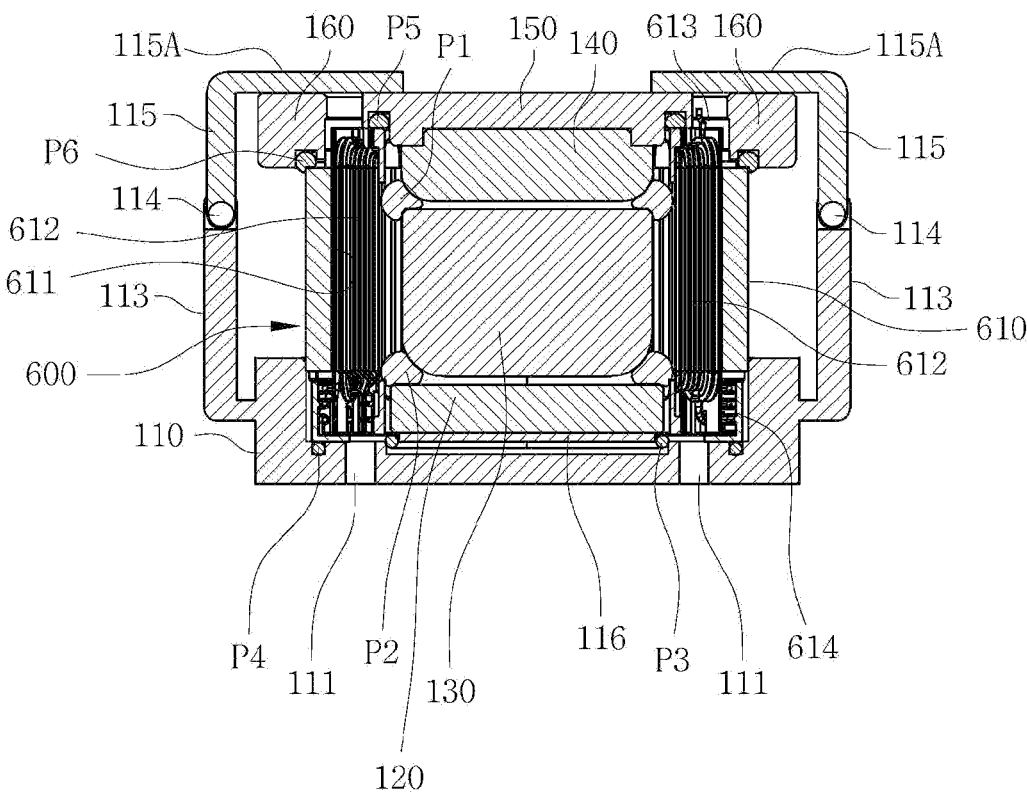
FIG. 4 is a cross-sectional view of the varnish impregnation device according to the embodiment of the present disclosure.
Figure 5:
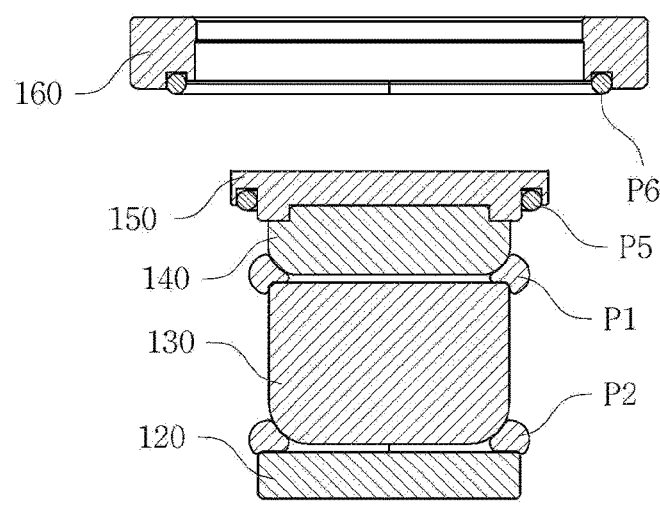
FIG. 5 is a cross-sectional view showing a state in which a stator is separated from the varnish impregnation device according to the embodiment of the present disclosure.
Figure 5:
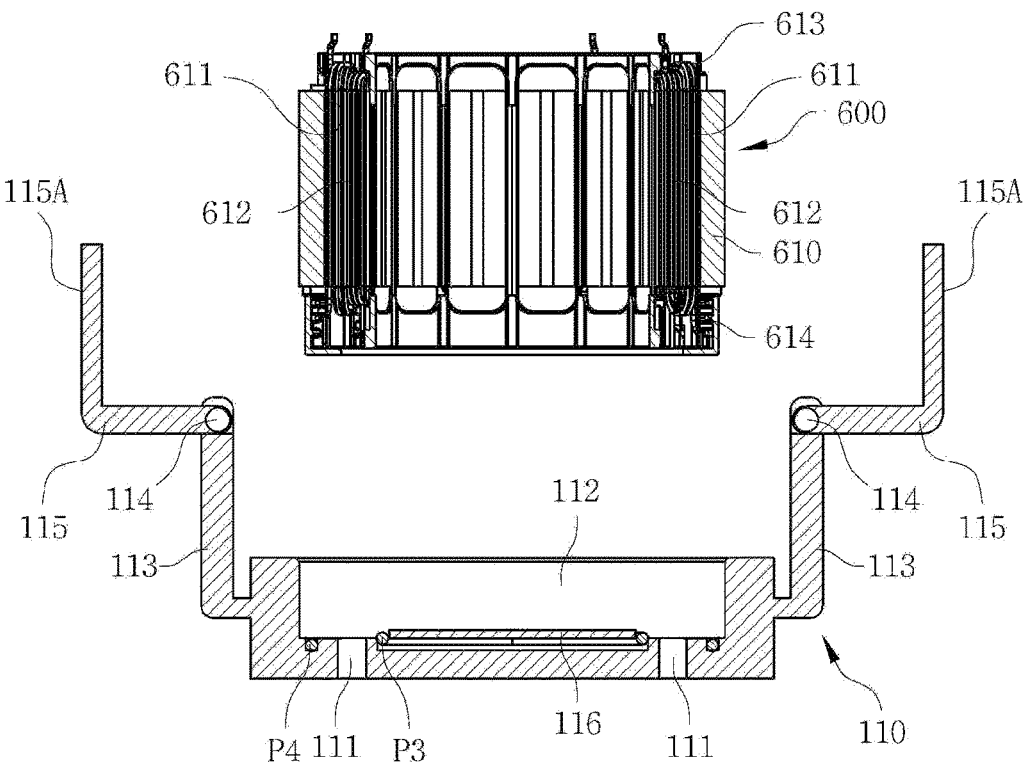

FIG. 1 is a perspective view showing a varnish impregnation device 100 according to an embodiment of the present disclosure. FIG. 2 is a perspective view showing the varnish impregnation device 100 according to the embodiment of the present disclosure from below. FIG. 3 is an exploded perspective view of the varnish impregnation device 100 according to the embodiment of the present disclosure. FIG. 4 is a cross-sectional view of the varnish impregnation device 100 according to the embodiment of the present disclosure. FIG. 5 is a cross-sectional view showing a state in which a stator is separated from the varnish impregnation device according to the embodiment of the present disclosure.

As shown in FIGS. 1 to 5, the varnish impregnation device 100 according to the embodiment of the present disclosure includes a lower housing 110, a lower sealing portion 120, a central sealing portion 130, an upper sealing portion 140, a first cover member 150, and a second cover member 160. The varnish impregnation device 100 is detachably installed in a vacuum chamber 200.

The lower housing 110 has a cup shape with an open top and is seated on a seating portion 230 of the vacuum chamber 200. A stator 600 is seated within the lower housing 110. The lower housing 110 has a plurality of varnish supply holes 111 which is formed to pass up and down through the lower surface thereof. An inner space of the lower housing 110 has an internal space 112 in which the stator 600 is seated. A pair of fixed supports 113 is formed to protrude upward from an outer wall of the lower housing 110. The fixed support 113 may be formed integrally with the lower housing 110 or may be formed as a separate member from the lower housing 110 and coupled to each other. A fastening portion 115 is coupled to the fixed support 113 by a hinge 114. The fastening portion 115 is rotatably coupled by the hinge 114. A bent portion 115A formed to be bent at a top of the fastening portion 115 serves to fasten and compress the first and second cover members 150 and 160.

The stator 600 includes a stator core 610 having a plurality of teeth protruding inward or outward and a slot 611 that is a space between the teeth, upper and lower insulators 613 and 614 respectively coupled to upper and lower portions of the stator core 610, and a coil winding 612 that passes through the slot 611 and is wound around the teeth.

The lower sealing portion 120 is coupled to a lower portion of an inner space of the stator 600 seated in the internal space 112 of the lower housing 110. The central sealing portion 130 is positioned over the lower sealing portion 120. A second packing member P2 is installed between an upper portion of the lower sealing portion 120 and a lower portion of the central sealing portion 130. The second packing member P2 seals a lower portion of an inner space of the stator core 610 of the stator 600, thereby preventing varnish from flowing into the lower portion of the inner space of the stator core 610. Although the lower sealing portion 120 and the central sealing portion 130 are described as separate members, they can be integrally formed as one piece. Also, the lower sealing portion 120 and the central sealing portion 130 are not necessarily securely coupled to an inner surface of the stator 600 and may not contact with the inner surface. This is because the lower portion of the inner space of the stator core 610 is sealed by the second packing member P2.

The upper sealing portion 140 is installed over the central sealing portion 130. A first packing member P1 is installed between a lower portion of the upper sealing portion 140 and an upper portion of the central sealing portion 130. As a result, the first packing member P1 seals an upper portion of the inner space of the stator core 610, thereby preventing the varnish B from flowing into the upper portion of the inner space of the stator core 610.

The first cover member 150 is coupled to an upper portion of the upper sealing portion 140 and an inner upper portion of the upper insulator 613, so that the varnish B is prevented from flowing into an upper portion of the inner space of the stator 600. The first cover member 150 and the upper sealing portion 140 may be integrally formed as one piece.

The second cover member 160 is coupled to an upper outer portion of the stator core 610 and an outer circumference of the upper insulator 613 at a certain distance from a circumference of the first cover member 150, so that the varnish B is prevented from flowing down to an upper outer surface of the stator 600. The second cover member 160 may be connected to the first cover member 150 by a plurality of bridges (not shown) at a certain distance, so that they may be a single member.

The varnish impregnation device 100 according to the embodiment of the present disclosure has a structure in which the fastening portion 115 rotatably coupled by the hinge 114 to the fixed support 113 of the lower housing 110 with the stator 600 seated covers the first and second cover members 150 and 160. The plurality of varnish supply holes 111 formed in a lower portion of the lower housing 110 communicates with the slot 611 that is a space between the teeth of the stator core 610. The coil winding 612 is positioned in the slot 611. The varnish B is supplied from a lower portion of the varnish supply hole 111, and the supplied varnish B moves upward through the slot 611 and impregnates an upper portion of the coil winding 612.

A supporting member 116 is installed on a bottom surface of the internal space 112 of the lower housing 110 and simultaneously is installed on a lower inner diameter portion of the lower insulator 614 of the stator 600. A third packing member P3 is installed between the lower inner diameter portion of the lower insulator 614 and the supporting member 116 and prevents the varnish from flowing into the inside of the lower insulator 614.

A fourth packing member P4 is installed on an outermost peripheral portion of the bottom surface of the internal space 112 of the lower housing 110 and seals a lower outer diameter portion of the lower insulator 614. Accordingly, the varnish is prevented from flowing into a lower outer surface of the lower insulator 614.

A fifth packing member P5 is installed on a circumference of a bottom surface of the first cover member 150. The fifth packing member P5 seals an upper inner diameter portion of the upper insulator 613, thereby preventing the varnish from flowing from an upper portion of the stator 600 into the inner surface of the stator 600.

A sixth packing member P6 is installed on a bottom surface of the second cover member 160. The sixth packing member P6 seals an upper outer diameter portion of the upper insulator 613, thereby preventing the varnish from flowing from the upper portion of the stator 600 into an outer surface of the stator 600.

Figure 6:
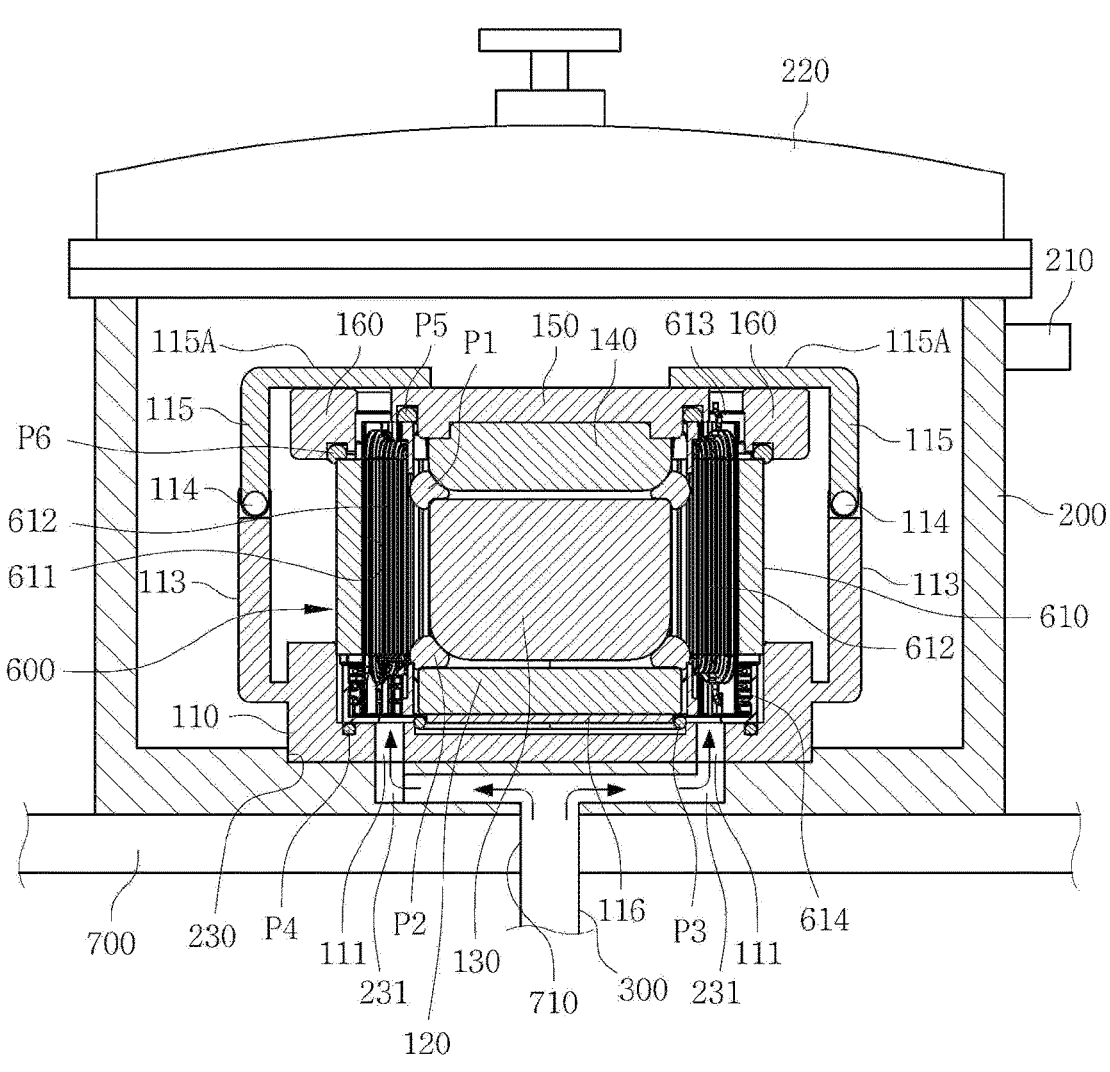
FIG. 6 is a cross-sectional view showing that the varnish impregnation device according to the embodiment of the present disclosure is installed in a vacuum chamber.

FIG. 6 is a cross-sectional view showing that the varnish impregnation device 100 according to the embodiment of the present disclosure is installed in a vacuum chamber 200. Referring to FIG. 6, the varnish impregnation device 100 according to the embodiment of the present disclosure is installed in a recess-shaped seating portion 230 formed on a bottom surface of the cup-shaped vacuum chamber 200 with an open top. A vacuum cover 220 is installed on the vacuum chamber 200 and seals an internal space of the vacuum chamber 200. An air passage 210 is installed on a side of the vacuum chamber 200. The air passage 210 discharges air within the vacuum chamber 200 to the outside, thereby causing the chamber to be in a vacuum state. Conversely, when the inside of the vacuum chamber 200 is in a vacuum state, the air passage 210 introduces external air into the vacuum chamber 200, thereby producing an equilibrium state with an external air pressure.

A varnish supply passage 231 communicating with the varnish supply hole 111 formed in the lower housing 110 of the varnish impregnation device 100 is formed in a central portion of the seating portion 230. The varnish supply passage 231 is connected to a pipe 300 through which the varnish B is supplied. The vacuum chamber 200 may be installed on a support frame 700. A connection hole 710 through which the pipe 300 passes is formed in the support frame 700.

As mentioned above, in the embodiment of the present disclosure, the central sealing portion 130, the lower sealing portion 120, and the upper sealing portion 140 may be formed integrally and provided as one member. Also, the first cover member 150 and the second cover member 160 may also be formed integrally and provided as one member. The first to sixth packing members P1 to P6 of the embodiment of present disclosure may use rubber, but are not necessarily limited thereto. The first to sixth packing members P1 to P6 may use various materials such as silicone and flexible resin, etc.

In the embodiment of the present disclosure, although it has been described above that one varnish impregnation device 100 is disposed in the vacuum chamber 200, a plurality of the varnish impregnation devices 100 may be disposed and used within one vacuum chamber 200. Also, it is allowed to use a plate (not shown) for installing the plurality of varnish impregnation devices 100. In this case, the plate must include a passage formed therein which communicates with each varnish impregnation device 100 and supplies the varnish B through the pipe 300.

Figure 7:
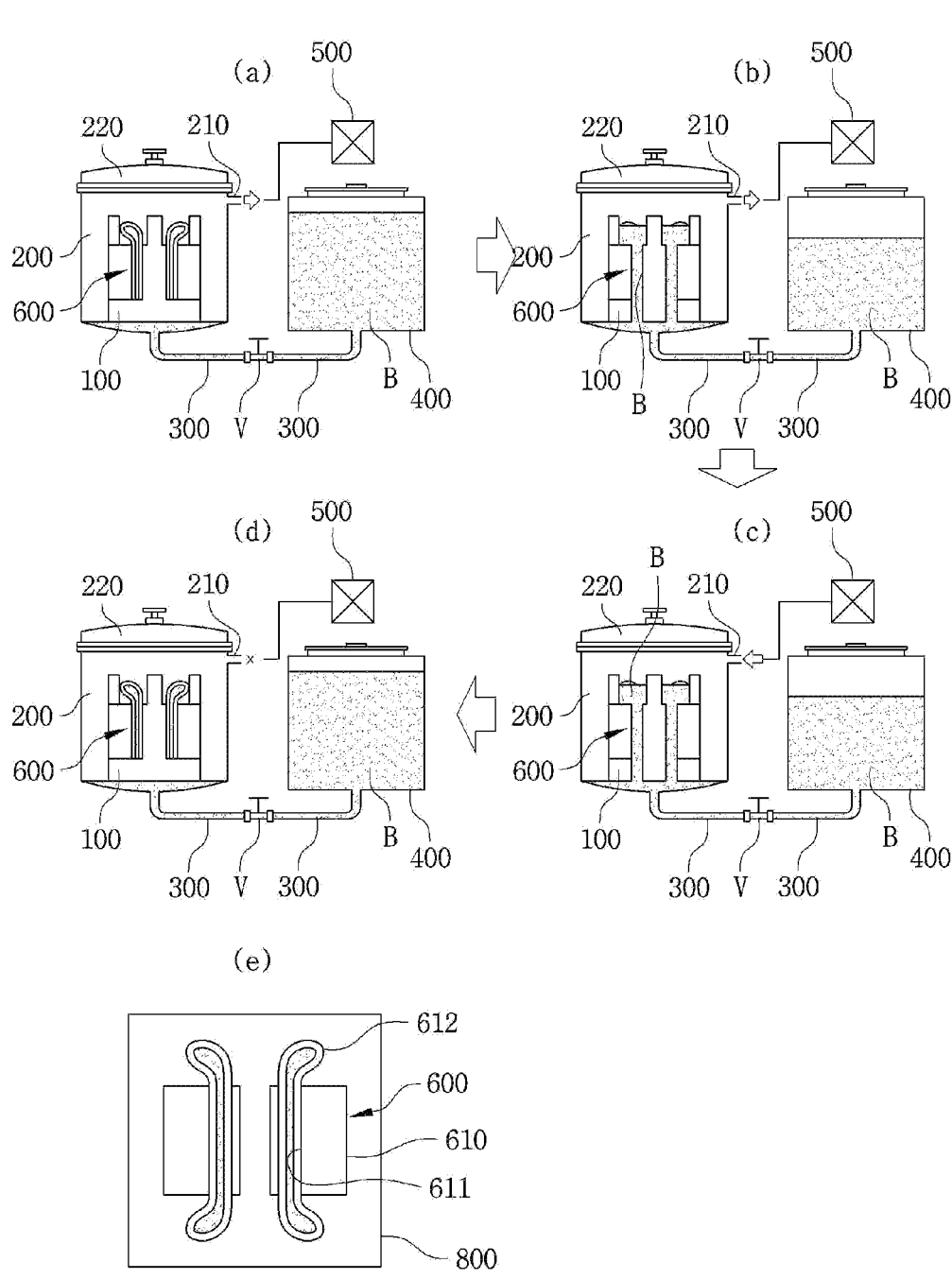
FIG. 7 is a conceptual view showing a process sequence of a varnish impregnation method of a stator coil winding, which uses the varnish impregnation device according to the embodiment of the present disclosure.

FIG. 7 is a conceptual view showing a process sequence of a varnish impregnation method of a stator coil winding, which uses the varnish impregnation device 100 according to the embodiment of the present disclosure. As shown in FIG. 7, the varnish impregnation device 100 according to the embodiment of the present disclosure is installed in the vacuum chamber 200. The vacuum chamber 200 is connected to a varnish storage tank 400 storing the varnish B through the pipe 300. A valve V is installed in the pipe 300 and controls the supply of the varnish B from the varnish storage tank 400 to the vacuum chamber 200. An air pump 500 is connected to the air passage 210 formed in the vacuum chamber 200. The air pump 500 may remove the air within the vacuum chamber 200 or may supply external air to the vacuum chamber 200.

The varnish impregnation method of the stator according to the embodiment of the present invention includes, as shown in (a) of FIG. 7, a first step of maintaining the inside of the vacuum chamber 200 to be in a vacuum state by discharging the air within the vacuum chamber 200 to the outside by the air pump 500 in a state where the stator 600 is seated on the varnish impregnation device 100 installed in the vacuum chamber 200.

In the next second step, as shown in (b) of FIG. 7, by opening the valve V connected to the middle of the pipe 300 in the first step mentioned above, the varnish B stored in the varnish storage tank 400 is injected into the slot 611 of the stator core 610 through the varnish supply hole 111 formed in the lower housing 110 of the varnish impregnation device 100.

When the varnish B is injected into the slot 611 of the stator core 610 in such a vacuum state, inner and outer surfaces of the stator core 610 are not impregnated with the varnish B. Therefore, the varnish B is intended to be impregnated and applied only to the inside of the slot 611 and the coil winding 612 and is not intended to be applied only to the inner and outer surfaces of the stator core 610.

In the next third step, as shown in (c) of FIG. 7, by natural inflow of external air by using an internal and external air pressure difference or through the air pump 500 in the second step mentioned above, an air pressure within the vacuum chamber 200 comes to equilibrium with the external air pressure. Then, the varnish B is discharged from the vacuum chamber 200 by opening the valve V and by applying a positive pressure by the operation of the air pump 500, and is transferred again to the varnish storage tank 400.

In the next fourth step, as shown in (d) of FIG. 7, when the discharge of the varnish B from the vacuum chamber 200 in the third step is completed, the valve V is closed and the operation of the air pump 500 is stopped.

In the next fifth step, as shown in (e) of FIG. 7, the vacuum cover 220 of the vacuum chamber 200 is opened, and the stator 600 seated in the varnish impregnation device 100 is separated from the varnish impregnation device 100. Then, the stator 600 is withdrawn from the vacuum chamber 200 and is transferred to a curing device 800. Then, the varnish B applied to the coil winding 612 is cured.

According to the varnish impregnation method of the stator coil winding according to the embodiment of the present invention, it is possible to prevent defects due to dimensional change caused by applying the varnish B to the inner and outer surfaces of the stator 600. Furthermore, a separate process for removing the varnish B can be omitted, thereby improving the productivity of the stator 600, and the consumption of varnish B can be reduced, thereby reducing the manufacturing cost of the stator 600.

It should be noted that the above detailed description of the present invention is merely an example for understanding the present invention and is not intended to define the scope of the present invention. The scope of the present invention is defined by the appended claims, and any simple modifications or changes of the present invention within the scope of the claims should be understood as falling within the scope of the present invention.

| REFERENCE NUMERALS | |
| --- | --- |
| 100: Varnish Impregnation Device | 110: Lower Housing |
| 111: Varnish Supply Hole | 112: Internal Space |
| 113: Fixed Support | 114: Hinge |
| 115: Fastening Portion | 115a: Bent Portion |
| 116: Supporting Member | 120: Lower Sealing Portion |
| 130: Central Sealing Portion | 140: Upper Sealing Portion |
| 150: First Cover Member | 160: Second Cover Member |
| 200: Vacuum Chamber | 210: Air Passage |
| 220: Vacuum Cove | 230: Seating Portion |
| 231: Varnish Supply Passage | 300: Pipe |
| 400: Varnish Storage Tank | 500: Air Pump |
| 600: Stator | 610: Stator Core |
| 611: Slot | 612: Coil Winding |
| 613: Upper Insulator | 614: Lower Insulator |
| 700: Support Frame | 710: Connection Hole |
| 800: Curing Device | B: Varnish |
| V: Valve Members | P1-P6: First to Sixth Packing |

What is claimed is:

1. A varnish impregnation device of a stator coil winding, the varnish impregnation device comprising:

a lower housing in which a stator is seated in an internal space thereof, the stator including a stator core which has a plurality of teeth protruding inward or outward and has a slot that is a space between the teeth; an upper insulator and a lower insulator are respectively coupled to an upper portion and a lower portion of the stator core; and a coil winding that passes through the slot and is wound around the teeth;

a lower sealing portion which is coupled to a lower portion of an inner space of the stator seated in the internal space of the lower housing;

a central sealing portion which is positioned over the lower sealing portion;

an upper sealing portion which is positioned over the central sealing portion;

a first cover member which is coupled to an upper portion of the upper sealing portion and an inner upper portion of the upper insulator; and a second cover member which is coupled to an upper outer portion of the stator core and an outer circumference of the upper insulator at a predetermined distance from a circumference of the first cover member, wherein the lower housing has a plurality of varnish supply holes which are formed to pass up and down through a lower surface thereof, and the plurality of varnish supply holes communicates with the slot, wherein the coil winding is positioned in the slot and a varnish is supplied from a lower portion of the plurality of varnish supply holes and the varnish supplied moves upward through the slot and impregnates an upper portion of the coil winding.

2. The varnish impregnation device of the stator coil winding of claim 1, wherein a packing member is installed between an upper portion of the central sealing portion and a lower portion of the upper sealing portion and seals an upper portion of an inner space of the stator core, thereby preventing the varnish from flowing into the upper portion of the inner space of the stator core.

3. The varnish impregnation device of the stator coil winding of claim 1, wherein a packing member is installed between a lower portion of the central sealing portion and an upper portion of the lower sealing portion and seals a lower portion of an inner space of the stator core, thereby preventing the varnish from flowing into the lower portion of the inner space of the stator core.

4. The varnish impregnation device of the stator coil winding of claim 1, wherein a pair of fixed supports is formed to protrude upward from an outer wall of the lower housing, wherein a fastening portion is coupled to the fixed supports by a hinge and the fastening portion is rotatably coupled by the hinge, and wherein a bent portion formed to be bent at a top of the fastening portion fastens and compresses the first cover member and the second cover member.

5. The varnish impregnation device of the stator coil winding of claim 1, further comprising a supporting member which is installed on a bottom surface of the internal space of the lower housing and is installed on a lower inner diameter portion of the lower insulator of the stator.

6. The varnish impregnation device of the stator coil winding of claim 5, wherein a packing member is installed between the lower inner diameter portion of the lower insulator and the supporting member and prevents the varnish from flowing into an inside of the lower insulator.

7. The varnish impregnation device of the stator coil winding of claim 1, wherein a packing member is installed on an outermost peripheral portion of a bottom surface of the internal space of the lower housing and seals a lower outer diameter portion of the lower insulator, thereby preventing the varnish from flowing into the lower outer diameter portion of the lower insulator.

8. The varnish impregnation device of the stator coil winding of claim 1, wherein a packing member is installed on a circumference of a bottom surface of the first cover member and seals an upper inner diameter portion of the upper insulator, thereby preventing the varnish from flowing from an upper portion of the stator into an inner surface of the stator.

9. The varnish impregnation device of the stator coil winding of claim 1, wherein a packing member is installed on a bottom surface of the second cover member and seals an upper outer diameter portion of the upper insulator, thereby preventing the varnish from flowing from an upper portion of the stator into an outer surface of the stator.

* * * * *